June 24, 1952  W. J. MILLER  2,601,546
DEEP WELL ELECTRIC COOKER
Filed Aug. 2, 1950  2 SHEETS—SHEET 2

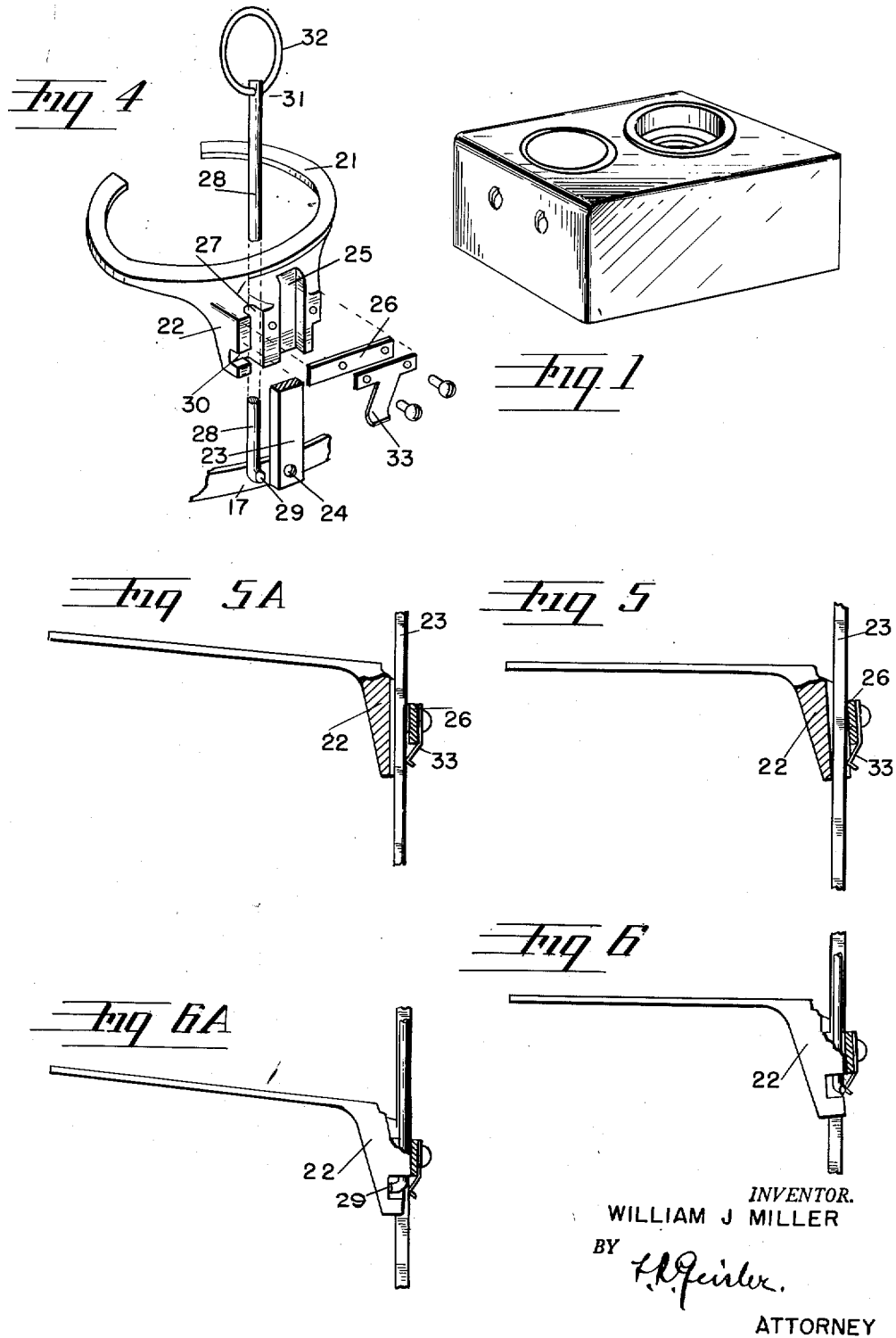

*INVENTOR.*
WILLIAM J MILLER
BY
*ATTORNEY*

Patented June 24, 1952

2,601,546

UNITED STATES PATENT OFFICE 2,601,546

DEEP WELL ELECTRIC COOKER

William J. Miller, Portland, Oreg.

Application August 2, 1950, Serial No. 177,201

6 Claims. (Cl. 219—37)

The present invention relates in general to an electric cooking apparatus, such as an electric cooking stove, and, more specifically, relates to the cooking well portion of the electric stove. This application is a continuation in part of my pending applications, Serial No. 66,637 filed under date of December 22, 1948, now Patent No. 2,527,-566, and entitled "Electric Cooking Well Assembly."

The present invention, like that described in the pending parent application, has, as one of its objects, the providing of an electric cooking well assembly permitting the heating element to be quickly and easily set at any desired location, thus at the top, at the bottom, or at any intermediate location, within the cooking well, as desired.

Another object of this invention is to provide a simplified deep well electric cooker which can be easily installed in, or removed from, any electric cooking range or similar device having a space for a cooking well.

In my parent pending application, above referred to, the electric heating element for the deep well cooker is supported on a slidable frame which is adjustable on a single mounting bar, and cooperating means are provided at opposite sides of the frame and cooking well for adjusting the frame location in the well. The present invention is concerned with a further modification of the mounting and adjusting means for the element-supporting frame through which the changing of the location of the frame is accomplished entirely by the manipulation of only a single member at one side of the cooking well assembly, thus making possible a further simplification in the electric cooking well assembly of the type described in the parent application.

The manner in which this additional simplification and related improvements in an electric cooking well assembly are attained with the present invention, and the advantages of the same, will be readily understood from the following brief description and explanation. Reference is to be made to the accompanying drawings, in which:

Fig. 1 is a perspective view, more or less diagrammatic, of a small electric cooking stove having a cavity to accommodate an electric cooking well, and showing my deep well electric cooker in place therein;

Fig. 2 is an elevation of my deep well electric cooker drawn to a larger scale with a portion of the cylindrical housing shown broken away to show the supporting frame for the electric heating element, and also showing the manner in which the said frame is mounted in the well, together with the means for adjusting the location of the frame within the well, the element-supporting frame being shown in inclined movable position;

Fig. 4 is an exploded perspective view of the element-supporting frame, with its mounting bracket, mounting bar, and adjusting rod, but with the heating element and pan entirely removed from the frame;

Figs. 5 and 5A are partial vertical sections on line 5—5 of Fig. 3 showing the element-supporting frame in horizontal resting position and tilted to inclined movable position respectively;

Figs. 6 and 6A are corresponding elevations of the frame, mounting bracket, mounting bar, and adjusting rod for the purpose of illustrating the positions of the adjusting rod when the frame is in horizontal resting position and when the frame is tilted to inclined movable position respectively;

Figure 8A:
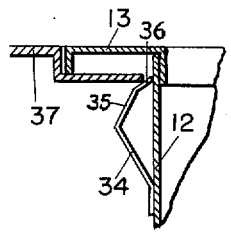
Figure 8B:
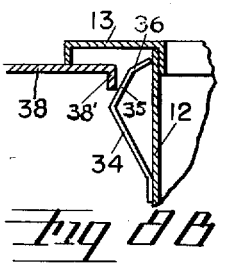
Figure 8C:
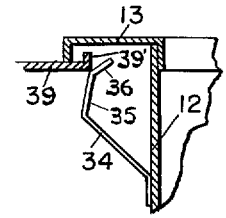
Figure 2:
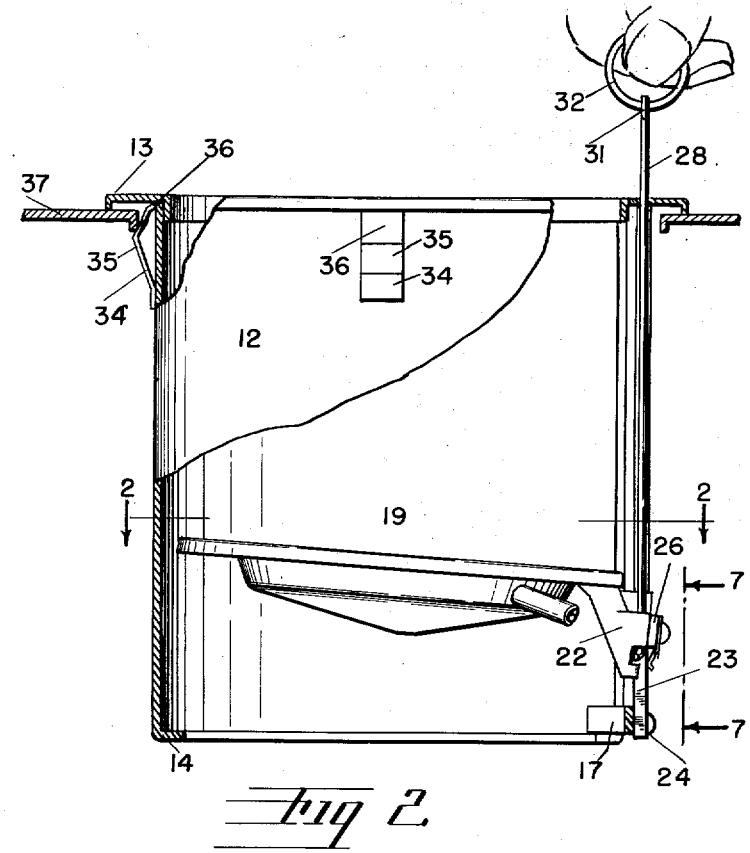
Figure 7:
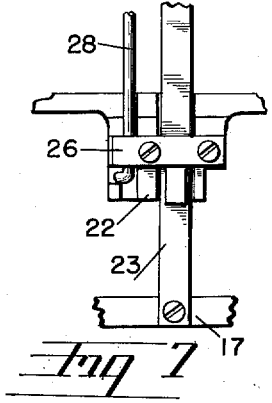

Fig. 7 is a fragmentary elevation of the mounting bracket and the adjusting rod for the element-supporting frame, taken on line 7—7 of Fig. 2, but drawn to an enlarged scale; and Figs. 8A, 8B and 8C are fragmentary elevations of the top portion of the cylindrical housing of the deep well cooker, illustrating the manner in which the spring elements on the exterior of the housing enable the device to accommodate itself to differently formed openings and openings of slightly different diameters which are to be found in the top cooking surfaces of different makes of electric ranges.

Fig. 1 illustrates a small portable electric cooking stove, designated in general by the reference character 10, having a front electrical cooking element which is arranged at the level of the top surface of the stove, and having a rear cavity to accommodate an electric cooking well, in which my deep well electric cooker is shown installed. It is to be understood, however, that my device may similarly be installed in any type of electric cooking stove or electric range in which space for a deep well cooker is provided.

Referring now more particularly to Fig. 2, my deep well cooking assembly includes a cylindrical wall or housing 12 connected at the top to an apron 13 which is preferably U-shaped and which is adapted to extend over the portion of the top surface of the stove or range immediately surrounding the well opening. At the bottom the cylindrical wall or housing 12 is formed with an inwardly-extending or horizontal flange 14 to provide the necessary rigidity for the lower portion of the housing. A side vertical slot 15 extends up one side of the cylindrical housing. The edge portions of the housing along each side of the slot 15 are preferably turned back on themselves, as shown at 16 in Fig. 3, to reinforce the housing along the opening. A curved bar 17, having the same radius of curvature as the housing, extends across the bottom of the slot 15 and has its ends secured to the adjacent portions of the bottom of the housing.

Figure 3:
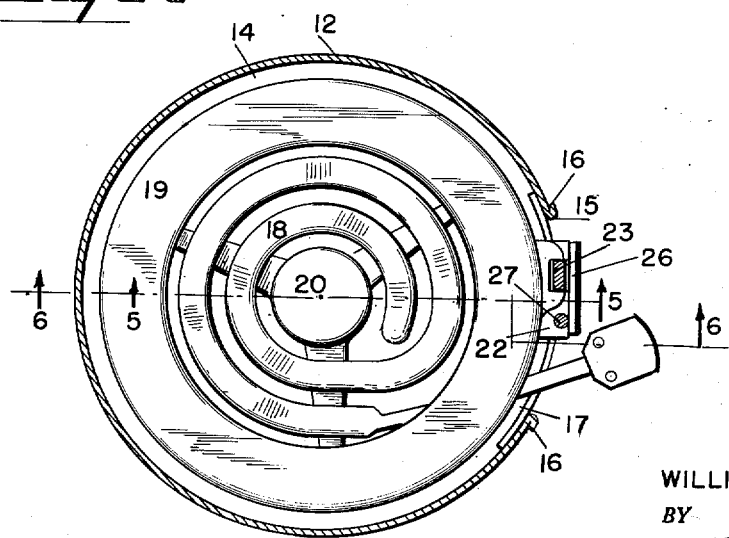
Fig. 3 is a sectional plan view of the deep well cooker taken on line 3—3 of Fig. 2.

The electric heating element for the deep well cooker is indicated by the reference character 18 in Fig. 3 and is removably supported in a pan 19 in any suitably manner. For example, as shown in Fig. 3, a spider-like bracket 20 is set in the dished portion of the pan 19 and the heating element in turn rests on the spider-like bracket 20. The pan 19 in turn is removably supported on a frame 21 (shown most clearly in Fig. 4) which comprises an incomplete ring formed with an integral bracket 22 extending from the middle portion.

This frame bracket 22 is adapted to have slidable engagement with a mounting bar 23 which extends vertically up through the slot 15 of the housing 12 parallel to the axis of the cylindrical housing. The bottom end of the mounting bar 23 is secured to the curved bar 17 at the bottom of the slot by any suitable means, for example, by a screw 24 (Figs. 2 and 4) and the top end of the mounting bar 23 is similarly secured to the apron 13 at the top of the housing. This mounting bar 23 is preferably, though not necessarily, rectangular in cross section.

The frame bracket 22 is formed with a groove 25 (Figs. 3 and 4) similar in cross section to the cross section of the mounting bar 23, but the depth of the groove 25 from the outside face of the bracket is greater than the corresponding cross sectional dimension of the bar 23. The bottom of the groove 25 and the outside face of the bracket 22, which extend in parallel planes, are angularly divergent from the vertical when the top face of the frame 21 is horizontal. In other words, as shown in Figs. 5 and 5A the outside face of the bracket 22 and the bottom face of the groove 25 in the bracket 22 do not extend at angles of 90° with respect to the plane of the top face of the frame 21 but at an angle slightly less than 90°.

A short cross bar 26 extends horizontally across the outside face of the bracket 22 and thus extends transversely over the groove 25, and is rigidly secured to the outside face of the bracket 22 by screws. This cross bar 26 and the groove 25 consequently form a slot through which the vertical mounting bar 23 extends. The depth of the groove 25 from the outside face of the bracket 22 is such that when the frame 21 is in horizontal position (as illustrated in Fig. 5) the top edge of the cross bar 26 will engage one face of the mounting bar 23 and the bottom edge of the bracket 22 in the groove 25 will engage the opposite face of the mounting bar 23. Thus when the frame 21 is in horizontal position the frame will have a holding grip on the stationary mounting bar 23 and this holding grip will prevent the frame from sliding downwardly on the stationary mounting bar 23. However, when the frame 21 is tipped slightly upwardly into the position illustrated in Fig. 5A, the frame 21, while so tipped, will readily slide downwardly, or can be slid upwardly, on the mounting bar 23. It will be recognized that this adjustable mounting principle employed in connection with the frame 21 is similar to that employed for the heat-element carrier in the device in the copending parent application previously referred to.

The outside face of the bracket 22 is also formed with a second groove 27 (Figs. 3 and 4) over which the cross bar 26 likewise extends. A vertical adjusting rod 28 passes along this second groove and through the resulting slot formed by the groove and the cross bar. This second groove 27 corresponds in part to the cross sectional shape of the adjusting rod 28, though being somewhat larger in size, so that the adjusting rod ordinarily will slide freely in the groove and slot without being gripped by the bracket 22. Preferably the adjusting rod 28 is circular in cross section and the walls of the groove 27 will then form an incomplete cylinder having a diameter greater than that of the adjusting rod 28. The adjusting rod 28 extends up through an aperture in the apron 13 and normally is substantially parallel to the stationary mounting bar 23. The adjusting rod 28 is of sufficient length to reach to the bottom of the housing 12.

The bottom end of the adjusting rod 28 is given a right angle bend near its termination so as to form a very short integral bottom arm 29. A groove 30 (Fig. 4) extends laterally in the outside face of the bracket 22 from the bottom portion of the groove 27 and this laterally-extending groove 30 acts as a cam surface when engaged by the outer end of the bottom arm 29 of the adjusting rod 28 when the adjusting rod 28 is raised so as to bring the arm 29 level with the lateral groove 30, and when the rod 28 is turned so as to cause the outer end of the arm 29 to engage the groove 30.

When the outer end of the arm 29 of the adjusting rod 28 is thus brought into engagement with the groove 30, then further turning of the rod 28 will, as illustrated in Fig. 6A, cause the arm 29 to exert an inward pressure at the lower portion of the bracket 22, while the top edge of the cross bar 26 and the adjusting rod 38 will be brought into engagement. Then as the turning of the adjusting rod is continued slightly, the bracket 22 and frame 21 will be thrust into the upwardly tilted slidable position of Fig. 6A. When this occurs, and while the rod 28 is held in the turned position, the frame 21 can be slid upwardly or downwardly on the mounting bar 23 depending upon whether the operator permits the adjusting rod to move downwardly or pulls the adjusting rod upwardly. When the frame 21 has been moved up or down to the desired location, the adjusting rod 28 is given a turn in the opposite direction so as to bring the arm 29 out of engagement with the groove 30, and the adjusting rod is then permitted to drop down to its normal inactive position with the arm 29 at the bottom of the cooking well and the top of the rod 28 adjacent the top face of the apron 13.

The top of the adjusting rod 28 may be formed into a handle or may have a handle of any convenient size or shape attached thereto. I have found it most practical to form the top end of the rod 28 into an eye loop 31 (Figs. 2 and 4) and to have a loose ring 32 mounted therein for finger manipulation by the operator. Such a ring, when not being used, will rest on the outer periphery of the apron 13 and on the adjoining top surface of the stove and will remain comparatively cool, so that it can be handled without danger of burning the fingers, and also it will not be in the way when not in use.

I consider it desirable also to mount a flat spring element 33 (Figs. 4 and 5) on the outside face of the bracket 22, preferably on the cross bar 26, so that the free end of the spring will bear against the outside face of the mounting bar 23 and exert spring pressure on the bar 23. Such a spring element, due to its bearing pressure against the mounting bar 23, aids in preventing inadvertent settling of the frame 21, for example, under the influence of outside vibration. Furthermore, such a spring element acts in the nature of a partial brake in retarding the speed with which the frame will slide downwardly when the frame is permitted to drop by manipulation of the adjusting rod 28.

The arrangement of my device whereby the bottom arm 29 is caused to engage the groove 30 whenever the frame 21 and heating element are to be raised or lowered, has additional advantage. Thus it may happen that the bracket 22, for some reason or other, for example due to foreign particles becoming lodged in the groove 25, may stick on the mounting bar 23 and thus not drop readily by gravity when the frame 21 is tilted upwardly into adjusting position. Should this occur, a downward pressure on the adjusting rod 28, while the arm 29 still engages the groove 30, will nevertheless enable the operator to push the frame downwardly to the desired lower location even if the bracket 22 has a tendency to stick and to resist downward sliding by gravity on the mounting bar 23.

Near the top of the cylindrical housing 12, and on the outside face thereof, a plurality of spaced spring members 34 are mounted. The purpose of these spring members is to cause the housing 12, and thus the entire deep well cooker, to be seated firmly in the opening provided in the top surface of the stove or range. These spring members 34 are secured to the housing 12 at their bottom ends, and they are shaped so as to extend first outwardly and upwardly and finally upwardly and inwardly, terminating a short distance below the under side of the apron 13. The spring members are especially designed to enable the entire cooking well assembly to be installed in differently formed openings and openings of slightly different dimensions in the tops of cooking stoves and ranges since such well openings vary slightly with different makes of electric ranges. The manner in which these spring members 34 on the housing 12 enable my assembly to accommodate itself to different openings in electric ranges and stoves is illustrated in Figs. 8A, 8B and 8C.

In Fig. 8A the well opening in the range top 37 is shown slightly recessed (as in Fig. 1). In Fig. 8B the well opening in the range top 38 has a downwardly-extending flange 38'. In Fig. 8C the well opening in the range top 39 has an upwardly-extending flange 39'. The well openings are also of slightly different diameter. However the spring members 34, due particularly to their formation with adjustable bent sections 35 and 36, readily accommodate themselves to the different well openings as indicated in these figures and enable my assembly to be firmly positioned in any one of the well openings as desired.

I claim:

1. In a deep well electric cooker, adjustable supporting means for the electric heating element including a substantially vertical mounting bar located at one side of said well, an element-supporting frame having a bracket portion slidable on said mounting bar, a slot for said bar provided on said bracket and extending upwardly on said bracket at an angle slightly less than 90° with respect to the plane of said frame, the inclination of said slot with respect to said plane being such that the upper and lower edges of the outer and inner walls respectively of said slot will exert a gripping hold on the corresponding opposite faces of said mounting bar when said frame is in horizontal position but will permit said frame to slide on said mounting bar when said frame is tilted slightly upwardly from horizontal position, a substantially vertical adjusting rod located at one side of said well near said mounting bar, a second slot provided on said bracket parallel to said first slot and substantially the same length for said adjusting rod, said adjusting rod being rotatable and slidable up and down in said second slot, and a bracket-engaging element on the lower end of said adjusting rod for exerting a thrust in an inward direction on the bottom portion of said bracket when said bracket-engaging element is raised into contact with said bracket, whereby such inward thrust on said bottom portion of said bracket will cause said rod to engage the outer upper edge of said second slot and the combined result will be to cause said frame to be tilted upwardly from horizontal position into movable position.

2. In a deep well electric cooker of the character described, adjustable supporting means for the electric heating element including a substantially vertical mounting bar located at one side of said well, an element-supporting frame having a bracket portion slidable on said mounting bar, a slot for said bar provided on said bracket and extending upwardly on said bracket at an angle slightly less than 90° with respect to the plane of said frame, the cross section of said slot being similar to the cross section of said mounting bar, the inclination of said slot with respect to said plane of said frame being such that the upper and lower edges of the outer and inner walls respectively of said slot will exert a gripping hold on the corresponding opposite faces of said mounting bar when said frame is in horizontal position but will permit said frame to slide on said mounting bar when said frame is tilted slightly upwardly from horizontal position, a substantially vertical adjusting rod located at one side of said well near said mounting bar, a second slot provided on said bracket parallel to said first slot for said adjusting rod, said adjusting rod being rotatable and slidable up and down in said second slot, a thrust element on the bottom of said adjusting rod for exerting a thrust in an inward direction on the bottom portion of said bracket when said thrust element is raised into contact with said bracket, whereby such inward thrust on said bottom portion of said bracket will cause said rod to engage the outer upper edge of said second slot and the combined result will be to cause said frame to be tilted upwardly from horizontal position into movable position, and cooperating means near the bottom of said bracket adapted to engage said thrust element when said adjusting rod and said thrust element cause said frame to be tilted into movable position, whereupon manual upward or downward movement of said adjusting rod will move said frame and heating element up or down as desired.

3. In a deep well electric cooker of the character described, adjustable supporting means for the electric heating element comprising a substantially vertical mounting bar located at one side of said well, said mounting bar being rectangular in cross section, an element-supporting frame having a bracket portion slidable on said mounting bar, a slot for said bar provided on said bracket and extending upwardly on said bracket at an angle slightly less than 90° with respect to the plane of said frame, the cross section of said slot being similar to the cross section of said mounting bar, the inclination of said slot with respect to said plane of said frame being such that the upper and lower edges of the outer and inner walls respectively of said slot will exert a gripping hold on the corresponding opposite faces of said mounting bar when said frame is in horizontal position but will permit said frame to slide on said mounting bar when said frame is tilted slightly upwardly from horizontal position, a substantially vertical adjusting rod located at one side of said well near said mounting bar, a second slot provided on said bracket for said adjusting rod, said adjusting rod being rotatable and slidable up and down in said latter mentioned slot, an arm on the bottom of said adjusting rod for exerting a thrust in an inward direction on the bottom portion of said bracket when said arm is brought into contact with said bracket and said adjusting rod is given a partial rotation, whereby such inward thrust on said bottom portion of said bracket will cause said rod to engage the opposite upper edge of said latter mentioned slot and will result in said frame being tilted upwardly from horizontal position into movable position, and a transverse groove on said bracket adapted to be engaged by said arm on said adjusting rod when said adjusting rod and said arm cause said frame to be tilted into movable position, whereupon manual upward or downward movement of said adjusting rod will move said frame and heating element up or down as desired.

4. Claim 2 with the addition of a spring member carried by said bracket and bearing against said mounting bar to reduce the tendency of said bracket and frame to slide downwardly on said mounting bar.

5. A deep well electric cooker of the character described comprising a cylindrical housing, a vertical slot in one side of said housing, a substantially vertical mounting bar positioned in said slot and secured to said housing, an element-supporting frame having a bracket portion slidable on said mounting bar, a slot for said bar provided on said bracket and extending upwardly on said bracket at an angle slightly less than 90° with respect to the plane of said frame, the inclination of said slot with respect to said plane of said frame being such that the upper and lower edges of the outer and inner walls respectively of said slot will exert a gripping hold on the corresponding opposite faces of said mounting bar when said frame is in horizontal position but will permit said frame to slide on said mounting bar when said frame is tilted slightly upwardly from horizontal position, a substantially vertical adjusting rod located near said mounting bar and extending up beyond the top of said housing, a second slot provided on said bracket parallel to said first slot for said adjusting rod, said adjusting rod being rotatable and slidable up and down in said second slot, a bracket-engaging element on the lower end of said adjusting rod for exerting a thrust in an inward direction on the bottom portion of said bracket when said bracket-engaging element is raised into contact with said bracket, whereby such inward thrust on said bottom portion of said bracket will cause said rod to engage the outer upper edge of said second slot and the combined result will be to cause said frame to be tilted upwardly from horizontal position into movable position, a handle element at the top end of said adjusting rod, and positioning spring members on the outside of the upper portion of said housing for holding said cooker firmly in place in the stove top, said spring members having their bottom ends secured on said housing, the lower main portion of each of said spring members extending obliquely outwardly and upwardly from said housing and the upper portion of each spring member extending upwardly and inwardly and adapted to engage the rim of the opening in said stove top for said cooker, said spring members permitting said cooker to be held in place in openings of slightly varying size in the stove top.

6. A deep well electric cooker of the character described comprising a cylindrical housing, a vertical slot in one side of said housing, a substantially vertical mounting bar positioned in said slot and secured to said housing, said mounting bar being rectangular in cross section, an element-supporting frame having a bracket portion slidable on said mounting bar, a slot for said bar provided on said bracket and extending upwardly on said bracket at an angle slightly less than 90° with respect to the plane of said frame, the cross section of said slot being similar to the cross section of said mounting bar, the inclination of said slot with respect to said plane of said frame being such that the upper and lower edges of the outer and inner walls respectively of said slot will exert a gripping hold on the corresponding opposite faces of said mounting bar when said frame is in horizontal position but will permit said frame to slide on said mounting bar when said frame is tilted slightly upwardly from horizontal position, a substantially vertical adjusting rod located near said mounting bar and extending up beyond the top of said housing, a second slot provided on said bracket for said adjusting rod, said adjusting rod being rotatable and slidable up and down in said latter mentioned slot, an arm on the bottom of said adjusting rod for exerting a thrust in an inward direction on the bottom portion of said bracket when said arm is brought into contact with said bracket and said adjusting rod is given a partial rotation, whereby such inward thrust on said bottom portion of said bracket will cause said rod to engage the opposite upper edge of said latter mentioned slot and will result in said frame being tilted upwardly from horizontal position into movable position, a transverse groove on said bracket adapted to be engaged by said arm on said adjusting rod when said adjusting rod and said arm cause said frame to be tilted into movable position, whereupon manual upward or downward movement of said adjusting rod will move said frame and heating element up or down as desired, a handle ring at the top end of said adjusting rod, and positioning spring members on the outside of the upper portion of said housing for holding said cooker firmly in place in the stove top.

WILLIAM J. MILLER.

REFERENCES CITED

The following references are of record in the file of this patent:

UNITED STATES PATENTS

| Number | Name | Date |
| --- | --- | --- |
| 848,991 | Harvey | Apr. 2, 1907 |
| 1,276,501 | Douglas | Aug. 20, 1918 |
| 2,025,252 | Stencell | Dec. 24, 1935 |
| 2,257,580 | Trompeter | Sept. 30, 1941 |
| 2,485,698 | Chesser et al. | Oct. 25, 1949 |